(12) United States Patent
Jeong (10) Patent No.: US 11,353,013 B2
(45) Date of Patent: Jun. 7, 2022

(54) MULTI-STAGE COMPRESSOR AND METHOD OF CONTROLLING THE SAME

(71) Applicants: Hyundai Motor Company, Seoul (KR); Kia Motors Corporation, Seoul (KR)

(72) Inventor: Seong Bin Jeong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 264 days.

(21) Appl. No.: 16/739,347

(22) Filed: Jan. 10, 2020

(65) Prior Publication Data
US 2021/0054845 A1   Feb. 25, 2021

(30) Foreign Application Priority Data

Aug. 22, 2019   (KR) .................. 10-2019-0103154

(51) Int. Cl.
| | |
|---|---|
| *F04B 25/04* | (2006.01) |
| *F04C 29/12* | (2006.01) |
| *F04C 9/00* | (2006.01) |
| *F04B 49/02* | (2006.01) |
| *F04B 27/10* | (2006.01) |
| *F04B 27/16* | (2006.01) |
| *F04B 49/08* | (2006.01) |
| *B60H 1/32* | (2006.01) |

(52) U.S. Cl.
CPC .......... *F04B 25/04* (2013.01); *B60H 1/3222* (2013.01); *F04B 27/1054* (2013.01); *F04B 27/16* (2013.01); *F04B 49/022* (2013.01); *F04B 49/08* (2013.01); *F04C 9/002* (2013.01); *F04C 29/124* (2013.01); *B60H 2001/3286* (2013.01)

(58) Field of Classification Search
None
See application file for complete search history.

(56) References Cited

U.S. PATENT DOCUMENTS

| | | | | |
|---|---|---|---|---|
| 4,553,903 A | * | 11/1985 | Ashikian | ................. F04B 25/04 |
| | | | | 417/204 |
| 2015/0059382 A1 | * | 3/2015 | Noda | .................... F25B 31/008 |
| | | | | 62/238.6 |

FOREIGN PATENT DOCUMENTS

KR       101116209 B1    6/2012

* cited by examiner

*Primary Examiner* — Peter J Bertheaud
*Assistant Examiner* — Geoffrey S Lee
(74) *Attorney, Agent, or Firm* — Slater Matsil, LLP

(57) ABSTRACT

A multi-stage compressor includes a compression module configured to compress a refrigerant therein through reciprocation of a plurality of pistons provided in a front housing, a rear housing coupled to the front housing to define an internal space between the front housing and the rear housing; a separation plate located between the front housing and the rear housing to separate the internal space between the front housing and the rear housing into a front space and a rear space; and a partition wall coupled to the rear housing to partition the rear space into an injection space before a refrigerant injected thereinto is primarily compressed, a primary discharge space from which the refrigerant is discharged in a primary compressed state by some of the pistons, and a secondary discharge space from which the primary compressed refrigerant is discharged.

20 Claims, 6 Drawing Sheets

MULTI-STAGE COMPRESSOR AND METHOD OF CONTROLLING THE SAME

CROSS-REFERENCE TO RELATED APPLICATIONS

This application claims priority to Korean Patent Application No. 10-2019-0103154, filed on Aug. 22, 2019, which application is hereby incorporated herein by reference.

TECHNICAL FIELD

The present disclosure relates to a multi-stage compressor and a method of controlling the same.

BACKGROUND

The cycle of a typical air conditioning system is divided into single-stage compression and multi-stage compression.

A conventional single-stage compression air conditioning system performs a cycle in which the high-temperature and high-pressure refrigerant compressed by a compressor releases heat to the outside while passing through a condenser to condense into a low-temperature and high-pressure refrigerant and then expand into a low-temperature and low-pressure refrigerant through a sensing means such as an expansion valve, and absorbs heat from the outside in an evaporator to return back to the compressor after realizing of cooling.

In addition, a conventional multi-stage compression air conditioning system is typically a two-stage compression system. The two-stage compression system has a configuration in which a compressor, a condenser, and an expansion valve are added one by one, a gas-liquid separator is added, and wiring and piping are complicated in the single-stage compression air conditioning system.

The conventional multi-stage compression air conditioning system has advantages of increasing a circulation rate of refrigerant, increasing a compressor volumetric efficiency, and reducing a discharge temperature, compared to the single-stage compression air conditioning system. A multi-stage compression system has been developed and applied to a typical building air conditioning system.

However, only a single-stage compression system has been developed and applied to an air conditioning system with limited space, such as a vehicle air conditioning system, without the bulky multi-stage compression system applied thereto.

Therefore, there is a need for a technology that applies the multi-stage compression system to the air conditioning system with limited space.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure describes a multi-stage compressor capable of incorporating functions of first and second compressors to be driven in a limited space, and a method of controlling the same.

In accordance with one aspect of the present disclosure, a multi-stage compressor includes a compression module configured to compress a refrigerant therein through reciprocation of a plurality of pistons provided in a front housing, a rear housing coupled to the front housing to define an internal space therebetween, a separation plate located between the front housing and the rear housing to separate the internal space between the front housing and the rear housing into a front space and a rear space, and a partition wall coupled to the rear housing to partition the rear space into an injection space before a refrigerant injected thereinto is primarily compressed, a primary discharge space from which the refrigerant is discharged in a primary compressed state by some of the pistons, and a secondary discharge space from which the primary compressed refrigerant is discharged in a secondary compressed state by some of the pistons.

The front housing may be connected to a power source to operate and reciprocate the pistons. For example, a swash plate may be connected to a shaft connected with the power source to operate and reciprocate the pistons.

The front housing, the separation plate, and the rear housing may be coupled to each other by a head bolt.

The separation plate may be formed with a plurality of inlets and outlets for introducing the refrigerant in the rear space into the front space or for discharging the refrigerant in the front space to the rear space.

The rear housing may be formed with an external discharge port for discharging the secondary compressed refrigerant to the outside, and an external insertion port for inserting the gaseous refrigerant, condensed and then primarily expanded, into the primary discharge space.

The partition wall may further include an integral partition wall coupled integrally with the rear housing, and a fluidized partition wall rotatably coupled to the rear housing to vary the number of cylinders of each piston used for the primary compression and the secondary compression.

The multi-stage compressor may further include a drive unit rotatably coupled to the rear housing to rotate the fluidized partition wall during driving, and a control unit configured to control the drive unit based on the pressure of the primary or secondary discharge space.

The drive unit may include a shaft rotatably connected integrally with the fluidized partition wall, an actuator for rotating the shaft during driving, and a bearing for assisting rotation of the shaft while fixing the shaft at a certain position and supporting a weight of and a load applied to the shaft.

The control unit may control the drive unit to be driven with the number of cylinders of the piston for the primary compression preset to a first number when the pressure ratio between the pressure of the primary discharge space and the pressure of the secondary discharge space exceeds a predetermined range value.

The control unit may control the drive unit to be driven with the number of cylinders of the piston for the primary compression preset to a second number when the pressure ratio between the pressure of the primary discharge space and the pressure of the secondary discharge space is within the predetermined range value, and the second number may be larger than the first number.

The control unit may control the drive unit to be driven with the number of cylinders of the piston for the primary compression preset to a third number when the pressure ratio between the pressure of the primary discharge space and the pressure of the secondary discharge space is less than the predetermined range value, and the third number may be larger than the second number.

In accordance with another aspect of the present disclosure, a method of controlling the multi-stage compressor according to the above aspect includes detecting the pressure of the primary or secondary discharge space, and controlling the drive unit based on the pressure of the primary discharge space or the pressure of the secondary discharge space determined in the detecting the pressure of the primary or secondary discharge space.

The controlling the drive unit may include controlling the drive unit to be driven with the number of cylinders of the piston for the primary compression preset to a first number when the pressure ratio between the pressure of the primary discharge space and the pressure of the secondary discharge space exceeds a predetermined range value.

The controlling the drive unit may include controlling the drive unit to be driven with the number of cylinders of the piston for the primary compression preset to a second number when the pressure ratio between the pressure of the primary discharge space and the pressure of the secondary discharge space is within the predetermined range value, and the second number may be larger than the first number.

The controlling the drive unit may include controlling the drive unit to be driven with the number of cylinders of the piston for the primary compression preset to a third number when the pressure ratio between the pressure of the primary discharge space and the pressure of the secondary discharge space is less than the predetermined range value, and the third number may be larger than the second number.

As apparent from the above description, the multi-stage compressor is effective in that the number of parts of the multi-stage compressor can be reduced by incorporating the functions of the first and second compressors, thereby reducing the volume of the multi-stage compressor and simplifying wiring and piping.

It is possible to reduce costs by virtue of the reduction in the number of parts of the multi-stage compressor.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF ILLUSTRATIVE EMBODIMENTS

The specific structural to functional descriptions disclosed in the specification or application are merely illustrated for the purpose of describing exemplary embodiments of the present disclosure. The present disclosure may be embodied in different forms and should not be construed as limited to the embodiments set forth herein.

The present disclosure may be subjected to various modifications and have various forms, and specific embodiments will be illustrated in the drawings and described in detail in the specification or application. However, this is not intended to limit the present disclosure to a specific embodiment. It should be understood that the present disclosure includes all modifications, equivalents or replacements that fall within the spirit and technical scope of the disclosure.

The terms such as first and/or second in the specification of the present disclosure may be used to describe various elements of the present disclosure, but these elements should not be limited by the terms. In other words, such terms will be used only for the purpose of differentiating one element from other elements of the present disclosure. For example, without departing from the scope and spirit of the present disclosure, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. On the other hand, it will be understood that when an element is referred to as being "directly coupled" or "directly connected" to another element, there are no intervening elements present. Other expressions for describing relationships between elements, for example, "between" and "immediately between" or "neighboring" and "directly neighboring" may also be interpreted likewise.

The terminology used in the specification is for the purpose of describing particular embodiments only and is not intended to limit the present disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in the specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A control unit (controller) according to exemplary embodiments of the present disclosure may be implemented through a processor (not illustrated) configured to perform the operation described below using an algorithm configured to control the operation of various components of the vehicle or a nonvolatile memory (not illustrated) configured to store data relating to software instructions for reproducing the algorithm and data stored in that memory. Here, the memory and the processor may be implemented as separate chips. Alternatively, the memory and the processor may be implemented as a single chip integrated with each other. The processor may take the form of one or more processors.

Hereinafter, the preferred embodiments of the present disclosure will be described in detail with reference to the accompanying drawings. In the drawings, like reference numerals refer to like parts throughout the embodiments of the present disclosure.

Figure 1:
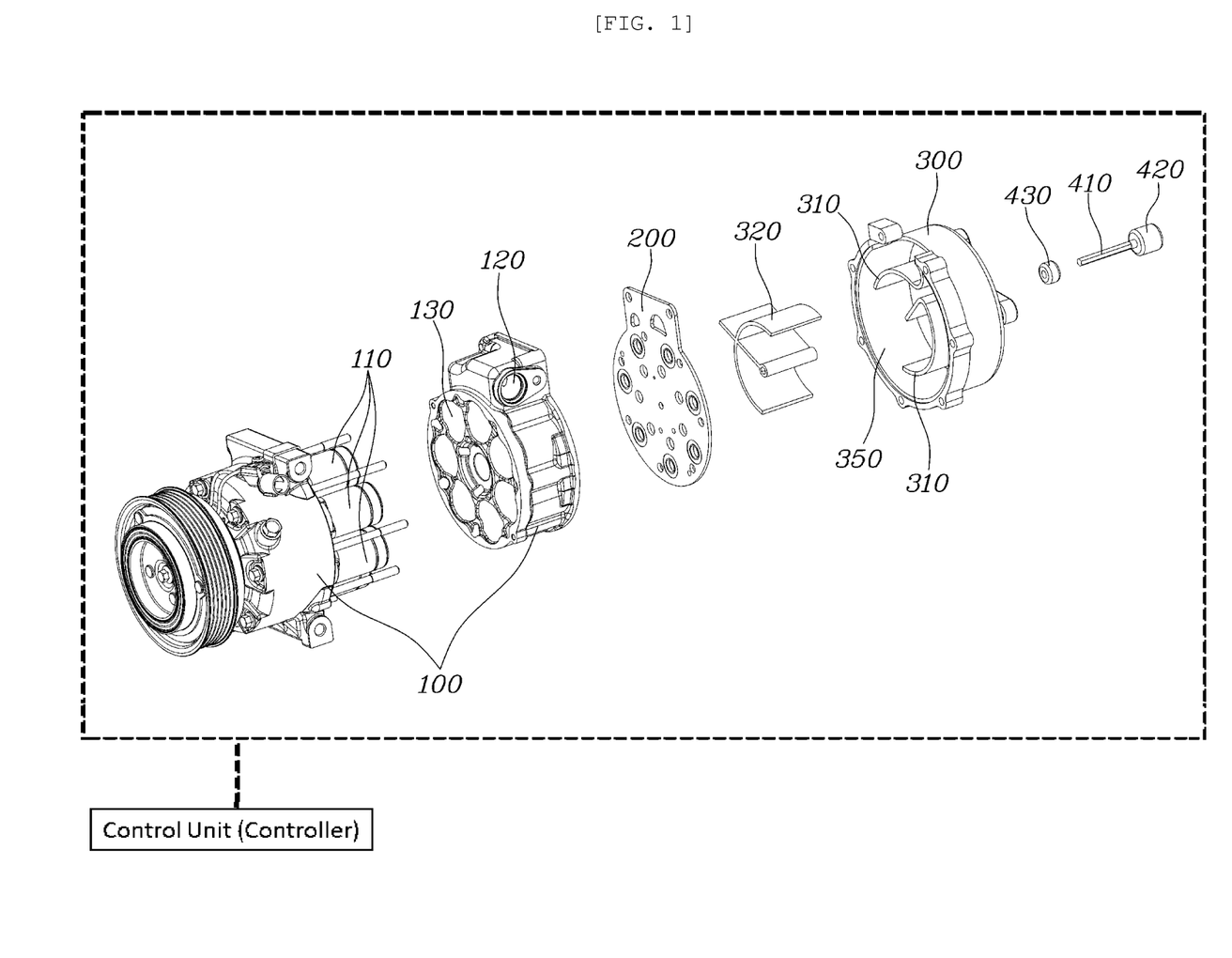
FIG. 1 is a view illustrating an overall configuration of a multi-stage compressor according to an embodiment of the present disclosure.
Figure 2:
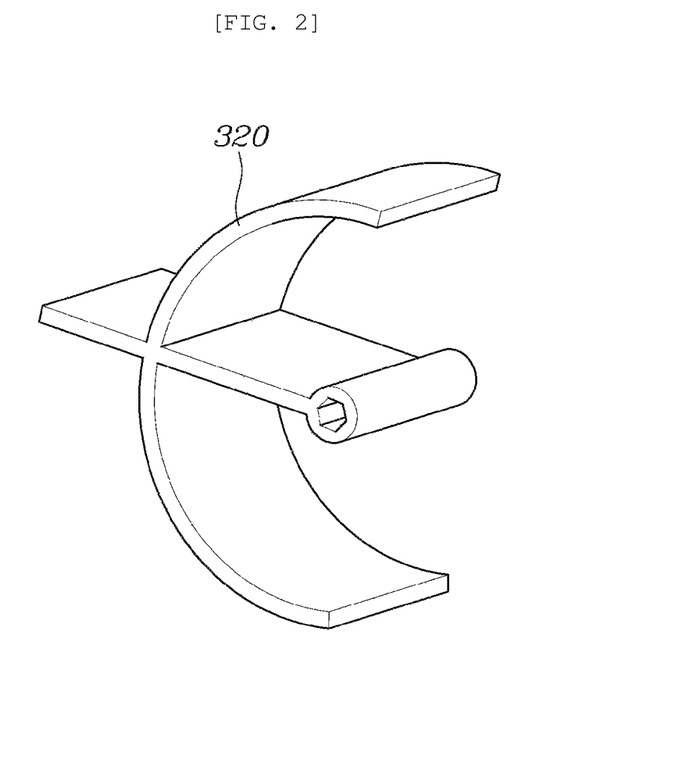
FIGS. 2 and 3 are views illustrating a component of the multi-stage compressor according to the embodiment of the present disclosure.
Figure 3:
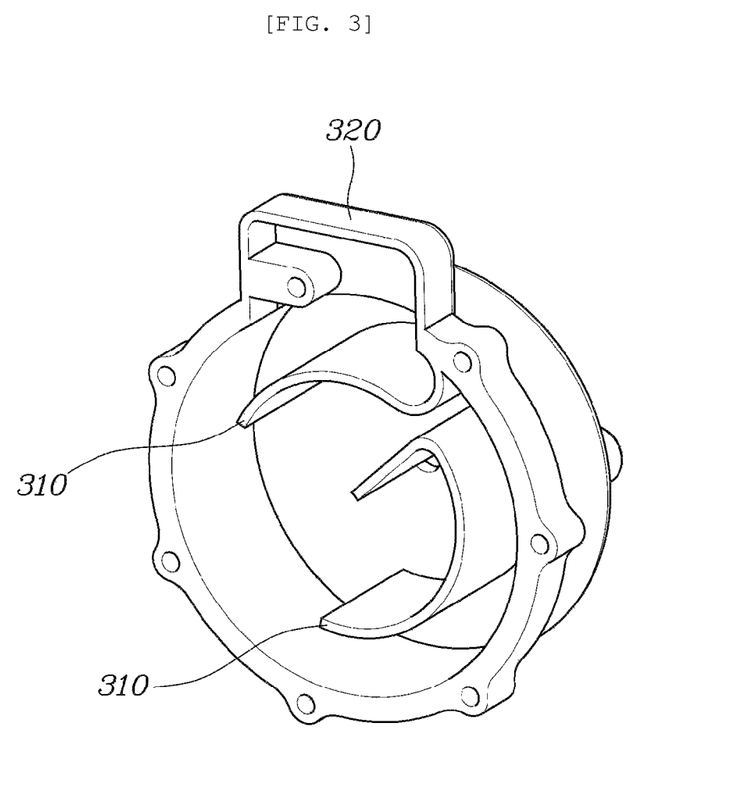
Figure 4:
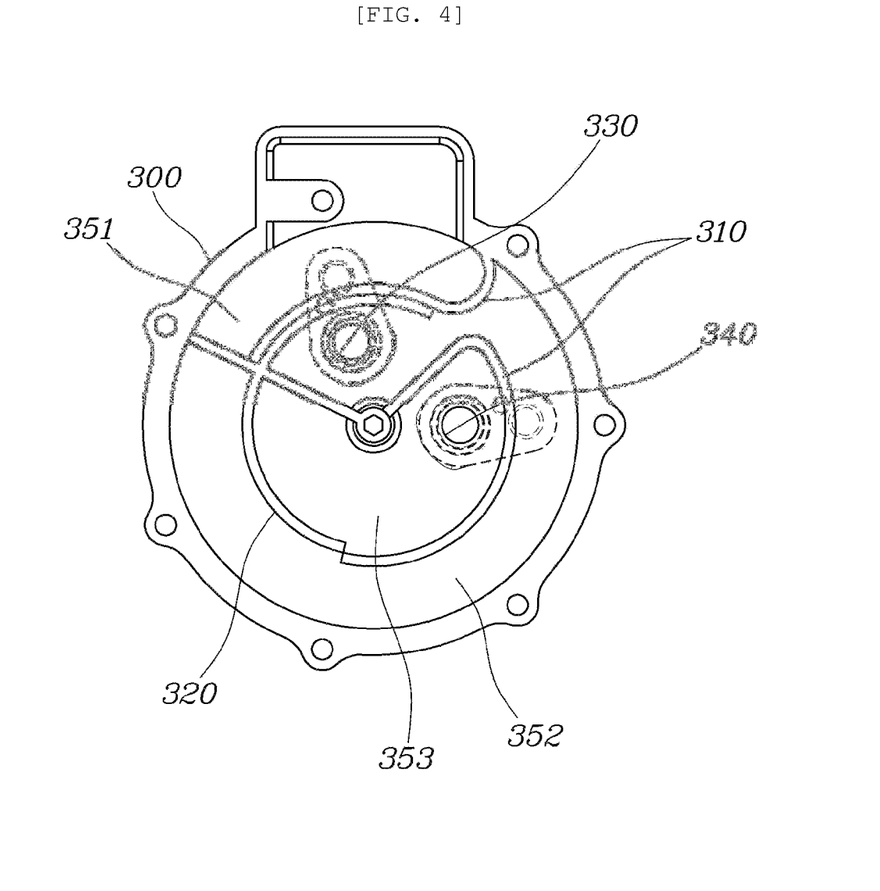
FIG. 4 is a partial assembly view according to the embodiment of the present disclosure.

FIG. 1 is a view illustrating an overall configuration of a multi-stage compressor according to an embodiment of the present disclosure. FIGS. 2 and 3 are views illustrating a component of the multi-stage compressor according to the embodiment of the present disclosure. FIG. 4 is a partial assembly view according to the embodiment of the present disclosure.

Referring to FIGS. 1 to 4, the multi-stage compressor according to the embodiment of the present disclosure includes a compression module to compress a refrigerant therein through reciprocation of a plurality of pistons 110 included in a front housing 100, a rear housing 300 coupled to the front housing 100 to define an internal space therebetween, a separation plate 200 located between the front housing 100 and the rear housing 300 to separate the internal space between the front housing 100 and the rear housing 300 into a front space 130 and a rear space 350, and a partition wall coupled to the rear housing 300 to partition the rear space 350 into an injection space 351 before the refrigerant injected thereinto is primarily compressed, a primary discharge space 352 from which the refrigerant is discharged in a primary compressed state by some of the pistons 110, and a secondary discharge space 353 from which the primary compressed refrigerant is discharged in a secondary compressed state by some of the pistons 110.

The front housing 100 of the present disclosure may include a refrigerant injection port 120 for injecting the refrigerant into the rear space 350 of the rear housing 300. The front housing 100 may be connected to a power source to operate the pistons 110. For example, a swash plate may be connected to a shaft connected with the power source to reciprocate the pistons 110. The front housing 100, the separation plate 200, and the rear housing 300 may be coupled to each other by a head bolt. The primary compression and the secondary compression are simultaneously performed through the reciprocation of the pistons 110 of the compression module.

The separation plate 200 may be formed with a plurality of inlets and outlets for introducing the refrigerant in the rear space 350 into the front space 130 or for discharging the refrigerant in the front space 130 to the rear space 350. The outlets and the inlets are in a single plate, and the outlets may allow the compressed refrigerant to flow out to the rear space 350 while the inlets may allow the refrigerant before the primary compression and the refrigerant before the secondary compression to flow into the front space 130.

Further referring to FIG. 4, the rear housing 300 may be formed with an external discharge port 340 for discharging the secondary compressed refrigerant to the outside and an external insertion port 330 for inserting the gaseous refrigerant, condensed and then primarily expanded, into the primary discharge space 352.

Specifically, the external discharge port 340 is connected to the outside in the secondary discharge space 353 in which the refrigerant is secondarily compressed, for example, to a condenser in a cooling cycle. The external insertion port 330 may allow the gaseous refrigerant, primarily expanded by a gas-liquid separate, to be inserted into the primary compression space to mix with the primary compressed refrigerant for secondary compression, thereby increasing the efficiency of multi-stage compression.

Figure 6:
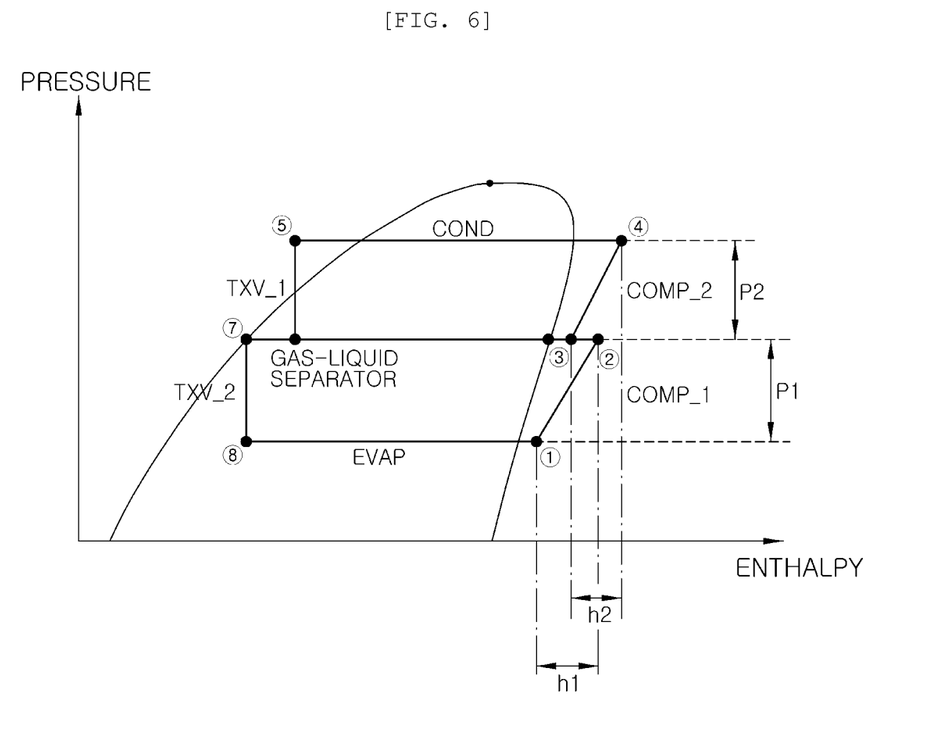
FIG. 6 is a graph illustrating a multi-stage compression cooling cycle according to the embodiment of the present disclosure.

FIG. 6 is a graph illustrating a multi-stage compression cooling cycle according to the embodiment of the present disclosure.

Referring to FIG. 6, after the second compression, the refrigerant is inserted into the gas-liquid separator through a first expansion valve TXV_1, so that the liquid refrigerant is inserted into a second expansion valve TXV_2 and the gaseous refrigerant is inserted into the primary discharge space 352 through the external insertion port 330.

Further referring to FIGS. 2 and 3, the partition wall may further include an integral partition wall 310 coupled integrally with the rear housing 300, and a fluidized partition wall 320 rotatably coupled to the rear housing 300 to vary the number of cylinders of each piston 110 used for the primary compression and the secondary compression.

Specifically, the angle of rotation of the fluidized partition wall 320 may be limited by the integral partition wall 310 and the number of cylinders of the piston 110 may be varied depending on the angle of rotation.

For example, in the case where the total number of cylinders of the piston 110 of the compression module is seven, when the angle of rotation of the fluidized partition wall 320 is 50 degrees at the reference point, a two-cylinder piston 110 may be used for the primary compression and a five-cylinder piston 110 may be used for the secondary compression. When the angle of rotation of the fluidized partition wall 320 is 100 degrees at the reference point, a three-cylinder piston 110 may be used for the primary compression and a four-cylinder piston 110 may be used for the secondary compression. When the angle of rotation of the fluidized partition wall 320 is 150 degrees at the reference point, a four-cylinder piston 110 may be used for the primary compression and a three-cylinder piston 110 may be used for the secondary compression.

The multi-stage compressor may further include a drive unit 400 rotatably coupled to the rear housing 300 to rotate the fluidized partition wall 320 during driving, and a control unit for controlling the drive unit 400 based on the pressure of the primary discharge space 352 or the pressure of the secondary discharge space 353.

The drive unit 400 is rotatably coupled to the rear side of the rear housing 300, and an actuator 420 is connected to the control unit to operate in response to the control signal of the control unit.

Specifically, the drive unit 400 may include a shaft 410 rotatably connected integrally with the fluidized partition wall 320, an actuator 420 for rotating the shaft 410 during driving, and a bearing 430 for assisting the rotation of the shaft 410 while fixing the shaft 410 at a certain position and supporting the weight of and the load applied to the shaft 410.

The fluidized partition wall 320 is coupled to the front side of the shaft 410, the actuator 420 is coupled to the rear side of the shaft 410, and the bearing 430 is coupled between the actuator 420 and the rear housing 300. Thus, it is possible to support the shaft 410.

As an example of the coupling of the shaft 410 and the fluidized partition wall 320, the shaft 410 may have a regular polygonal cross-section so as to be press-fitted integrally with the center hole of the fluidized partition wall 320, thereby enabling the fluidized partition wall 320 to rotate along with the rotation of the shaft 410. In addition to the coupling method, the shaft 410 and the fluidized partition wall 320 may be interconnected in different ways.

The control unit may control the drive unit 400 to be driven with the number of cylinders of the piston 110 for the primary compression preset to a first number when the pressure ratio between the pressure of the primary discharge space 352 and the pressure of the secondary discharge space 353 exceeds a predetermined range value. The control unit may control the drive unit 400 to be driven with the number of cylinders of the piston 110 for the primary compression preset to a second number when the pressure ratio between the pressure of the primary discharge space 352 and the pressure of the secondary discharge space 353 is within the predetermined range value. The control unit may control the drive unit 400 to be driven with the number of cylinders of the piston 110 for the primary compression preset to a third number when the pressure ratio between the pressure of the primary discharge space 352 and the pressure of the secondary discharge space 353 is less than the predetermined range value. The second number may be larger than the first number and the third number may be larger than the second number.

For example, when the pressure ratio between the pressure of the primary discharge space 352 and the pressure of the secondary discharge space 353 is preset in a range from 1.5 to 3 or less, the first, second, and third numbers for the number of cylinders of the piston 110 are preset to two, three, and four, respectively, and the number of cylinders of the piston 110 is controlled to be two, three, or four according to the pressure ratio between the pressure of the primary discharge space 352 and the pressure of the secondary discharge space 353, the control unit rotates the fluidized partition wall 320 according to an example of the fluidized partition wall 320 through the control of the drive unit 400.

Through the control of the control unit, it is possible to increase the driving efficiency of the piston 110 of the compression module.

Figure 5:
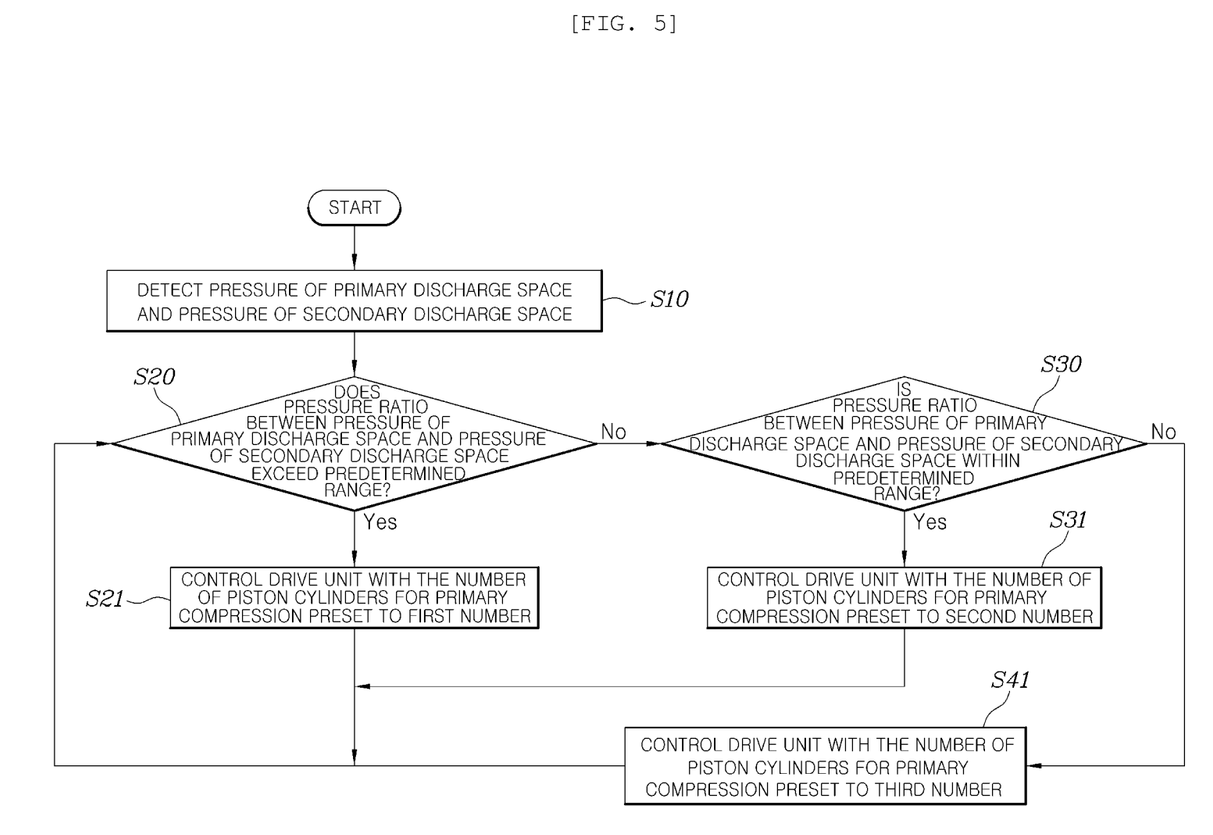
FIG. 5 is a control flowchart according to the embodiment of the present disclosure.

FIG. 5 is a control flowchart according to the embodiment of the present disclosure.

Referring to FIG. 5, the method of controlling the multi-stage compressor according to the present disclosure may include a detection step (S10) of detecting the pressure of the primary discharge space 352 or the pressure of the secondary discharge space 353, and a control step (S20, S30) of controlling the drive unit 400 based on the pressure of the primary discharge space 352 or the pressure of the secondary discharge space 353 determined in the detection step (S10).

The detector in the detection step (S10) is installed in each of the primary discharge space 352 and the secondary discharge space 353 in the rear housing 300 and is connected to the control unit.

The control step (S20, S30) may include a first drive control step (S21) of controlling the drive unit 400 to be driven with the number of cylinders of the piston 110 for the primary compression preset to a first number when the pressure ratio between the pressure of the primary discharge space 352 and the pressure of the secondary discharge space 353 exceeds a predetermined range value, a second drive control step (S31) of controlling the drive unit 400 to be driven with the number of cylinders of the piston 110 for the primary compression preset to a second number when the pressure ratio between the pressure of the primary discharge space 352 and the pressure of the secondary discharge space 353 is within the predetermined range value, and a third drive control step (S41) of controlling the drive unit 400 to be driven with the number of cylinders of the piston 110 for the primary compression preset to a third number when the pressure ratio between the pressure of the primary discharge space 352 and the pressure of the secondary discharge space 353 exceeds the predetermined range value. The second number may be larger than the first number and the third number may be larger than the second number.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A multi-stage compressor comprising:
a compression module configured to compress a refrigerant therein through reciprocation of a plurality of pistons provided in a front housing;
a rear housing coupled to the front housing to define an internal space between the front housing and the rear housing;
a separation plate located between the front housing and the rear housing to separate the internal space between the front housing and the rear housing into a front space and a rear space, wherein the separation plate is formed with a plurality of inlets and outlets for introducing the refrigerant in the rear space into the front space or for discharging the refrigerant in the front space to the rear space; and
a partition wall coupled to the rear housing to partition the rear space into an injection space before the refrigerant injected thereinto is primarily compressed, a primary discharge space from which the refrigerant is discharged in a primary compressed state by some of the pistons, and a secondary discharge space from which the primary compressed refrigerant is discharged in a secondary compressed state by some of the pistons.

2. The multi-stage compressor according to claim 1, wherein the multi-stage compressor is part of a vehicle air conditioning system.

3. The multi-stage compressor according to claim 1, wherein the rear housing is formed with an external discharge port for discharging the secondary compressed refrigerant to the outside, and an external insertion port for inserting gaseous refrigerant, condensed and then primarily expanded, into the primary discharge space.

4. A multi-stage compressor comprising:
a compression module configured to compress a refrigerant therein through reciprocation of a plurality of pistons provided in a front housing;
a rear housing coupled to the front housing to define an internal space between the front housing and the rear housing;
a separation plate located between the front housing and the rear housing to separate the internal space between the front housing and the rear housing into a front space and a rear space; and
a partition wall coupled to the rear housing to partition the rear space into an injection space before the refrigerant injected thereinto is primarily compressed, a primary discharge space from which the refrigerant is discharged in a primary compressed state by some of the pistons, and a secondary discharge space from which the primary compressed refrigerant is discharged in a secondary compressed state by some of the pistons, wherein the partition wall further comprises an integral partition wall coupled integrally with the rear housing, and a fluidized partition wall rotatably coupled to the rear housing to vary the number of cylinders of each piston used for the primary compression and the secondary compression.

5. The multi-stage compressor according to claim 4, further comprising a drive unit rotatably coupled to the rear housing to rotate the fluidized partition wall during driving.

6. The multi-stage compressor according to claim 5, wherein the drive unit comprises a shaft rotatably connected integrally with the fluidized partition wall, an actuator for rotating the shaft during driving, and a bearing for assisting rotation of the shaft while fixing the shaft at a certain position and supporting a weight of and a load applied to the shaft.

7. The multi-stage compressor according to claim 5, further comprising a control unit configured to control the drive unit based on the pressure of the primary or secondary discharge space.

8. The multi-stage compressor according to claim 7, wherein the control unit is configured to control the drive unit to be driven with the number of cylinders of the piston for the primary compression preset to a first number when the pressure ratio between the pressure of the primary discharge space and the pressure of the secondary discharge space exceeds a predetermined range value.

9. The multi-stage compressor according to claim 8, wherein the control unit is configured to control the drive unit to be driven with the number of cylinders of the piston for the primary compression preset to a second number when the pressure ratio between the pressure of the primary discharge space and the pressure of the secondary discharge space is within the predetermined range value, and the second number is larger than the first number.

10. The multi-stage compressor according to claim 9, wherein the control unit is configured to control the drive unit to be driven with the number of cylinders of the piston for the primary compression preset to a third number when the pressure ratio between the pressure of the primary discharge space and the pressure of the secondary discharge space is less than the predetermined range value, and the third number is larger than the second number.

11. A method of controlling the multi-stage compressor according to claim 6, the method comprising:
    detecting the pressure of the primary or secondary discharge space; and
    controlling the drive unit based on the pressure of the primary discharge space or the pressure of the secondary discharge space determined in the detecting the pressure of the primary or secondary discharge space.

12. The method according to claim 11, wherein controlling the drive unit comprises controlling the drive unit to be driven with the number of cylinders of the piston for the primary compression preset to a first number when the pressure ratio between the pressure of the primary discharge space and the pressure of the secondary discharge space exceeds a predetermined range value.

13. The method according to claim 12, wherein controlling the drive unit comprises controlling the drive unit to be driven with the number of cylinders of the piston for the primary compression preset to a second number when the pressure ratio between the pressure of the primary discharge space and the pressure of the secondary discharge space is within the predetermined range value, and the second number is larger than the first number.

14. The method according to claim 13, wherein controlling the drive unit comprises controlling the drive unit to be driven with the number of cylinders of the piston for the primary compression preset to a third number when the pressure ratio between the pressure of the primary discharge space and the pressure of the secondary discharge space is less than the predetermined range value, and the third number is larger than the second number.

15. The method according to claim 11, wherein controlling the multi-stage compressor comprises air conditioning the interior of a car.

16. A multi-stage compressor comprising:
    a compression module configured to compress a refrigerant therein through reciprocation of a plurality of pistons provided in a front housing;
    a rear housing coupled to the front housing to define an internal space between the front housing and the rear housing;
    a separation plate located between the front housing and the rear housing to separate the internal space between the front housing and the rear housing into a front space and a rear space, wherein the separation plate is formed with a plurality of inlets and outlets for introducing the refrigerant in the rear space into the front space or for discharging the refrigerant in the front space to the rear space; and
    a partition wall coupled to the rear housing to partition the rear space into an injection space before the refrigerant injected thereinto is primarily compressed, a primary discharge space from which the refrigerant is discharged in a primary compressed state by some of the pistons, and a secondary discharge space from which the primary compressed refrigerant is discharged in a secondary compressed state by some of the pistons, wherein the partition wall further comprises an integral partition wall coupled integrally with the rear housing, and a fluidized partition wall rotatably coupled to the rear housing to vary the number of cylinders of each piston used for the primary compression and the secondary compression.

17. The multi-stage compressor according to claim 16, further comprising a drive unit rotatably coupled to the rear housing to rotate the fluidized partition wall during driving.

18. The multi-stage compressor according to claim 17, wherein the drive unit comprises a shaft rotatably connected integrally with the fluidized partition wall, an actuator for rotating the shaft during driving, and a bearing for assisting rotation of the shaft while fixing the shaft at a certain position and supporting a weight of and a load applied to the shaft.

19. The multi-stage compressor according to claim 17, further comprising a control unit configured to control the drive unit based on the pressure of the primary or secondary discharge space.

20. The multi-stage compressor according to claim 16, wherein the multi-stage compressor is part of a vehicle air conditioning system.

* * * * *